Dec. 23, 1941.  H. HAWKINS  2,267,524
STEERING GEAR
Filed Aug. 12, 1939  2 Sheets-Sheet 2

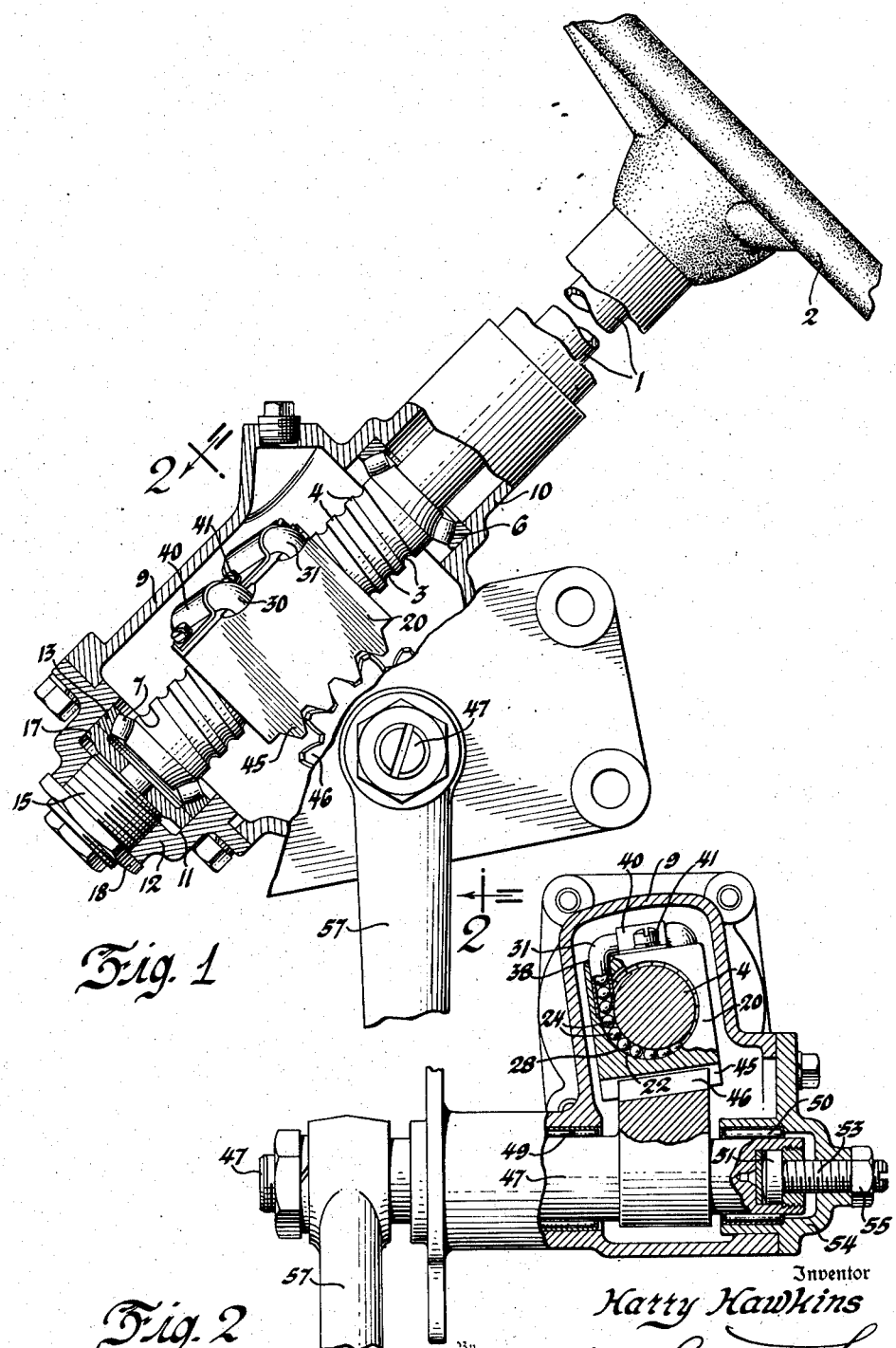

Inventor
Harry Hawkins
By
Blackmore, Spencer & Flint
Attorneys

Patented Dec. 23, 1941

2,267,524

UNITED STATES PATENT OFFICE 2,267,524

STEERING GEAR

Harry Hawkins, Saginaw, Mich., assignor to General Motors Corporation, Detroit, Mich., a corporation of Delaware Application August 12, 1939, Serial No. 289,753

2 Claims. (Cl. 74—499)

This invention relates to improvements in ball bearing screw and nut gears, of the type in which the screw and nut are provided with corresponding helical grooves forming a helical passage containing balls which constitute the screw thread connection between the screw and nut, and especially to such a screw and nut gear in which a limited number of balls is recirculated through the helical passage by means of a transfer return tube.

While the balls roll on the relatively moving surfaces of the screw and nut, they rub in opposite directions against each other as they move through the helical passage, and against the sides of the transfer return tube as they are pushed therethrough by succeeding balls, and the frictional resistance to circulation of the balls through such a circuit increases rapidly as the number of balls is increased.

In cases where the gear is heavily loaded, and particularly where there is a cocking load tending to tilt the nut on the screw, it is desirable to have a sufficient number of balls to extend through several turns of the helical passage for a distance axially of the screw which is considerably greater than the diameter thereof. When this is done, the resistance to movement of the balls through the helical passage and through a transfer return tube for recirculation, may be sufficient to defeat any advantage in their use.

The object of the invention is to reduce the total resistance to the movement of a given number of balls through the helical passage of a ball bearing screw and nut combination.

The above and other objects of the invention will be apparent as the description proceeds.

According to the invention the balls in the helical passage are divided into a plurality of separate and distinct trains, each of which is recirculated through its own transfer passage in an independent closed circuit. It has been found that this considerably reduces the frictional resistance to movement of the balls, and hence to relative movement between the screw and nut, and that what would otherwise be a structure with prohibitive friction is made completely satisfactory and advantageous.

The drawings show the application of the invention to a steering gear suitable for an automobile, in which the nut is moved axially of the screw by rotation thereof, and is provided with teeth so as to constitute a rack which transmits turning movement to a steering gear rock shaft, through a gear sector thereon.

In the drawings:

Figure 1 is a sectional elevational view of the gear with a part of the steering wheel and shaft connections broken away.

Figure 2 is a view substantially on line 2—2 of Figure 1 with parts broken away and in section.

Figure 3:
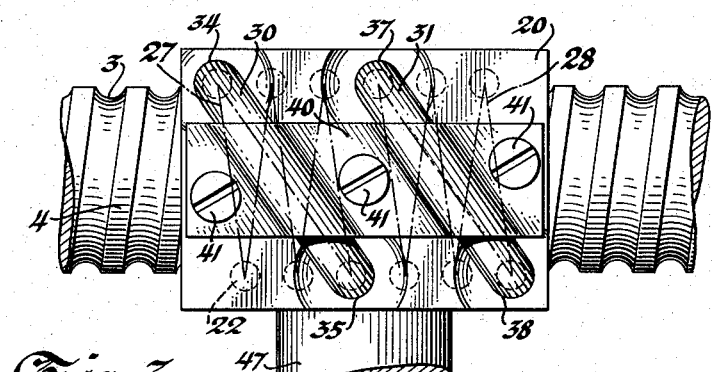
Figure 3 is an enlarged detailed view of a part of Figure 1.

The steering shaft 1, to which is secured the steering wheel 2, has a part provided with a helical groove 3 forming a screw 4, which is mounted between suitable opposed thrust bearings 6 and 7, in a housing 9. The bearing 6 is mounted in a sleeve portion 10 of the housing 9 while the bearing 7 is mounted in a bore 11 of the end cover 12 of the housing 9. The outer race 13 of the bearing 7 is slidable in the bore 11 and its position axially of the bore is adjustable to take up end play of the shaft 1 by means of an adjusting screw 15 in the end cover 12, which bears on an abutment 17 for the race 13 and is provided with a lock nut 18.

Figure 4:
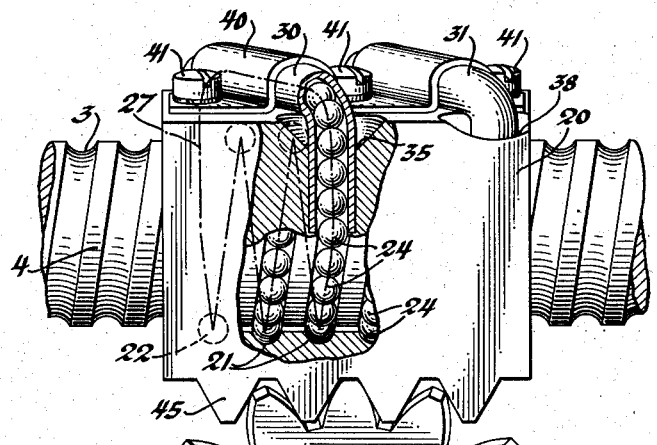
Figure 4 is a view similar to Figure 1 but enlarged with parts broken away and in section.
Figure 5:
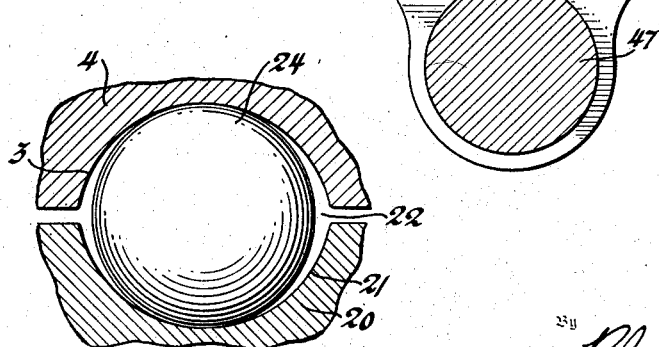
Figure 5 is a greatly enlarged cross-sectional view of the helical passage formed by the helical grooves in the screw and nut portions, with a ball in position therein.

On the screw 4, is a nut 20 having an internal helical groove 21 corresponding to the helical groove 3 on the screw 4, to form a helical passage 22 containing balls 24, which constitute the screw thread connection between the shaft 1 and the nut 20, as shown most clearly in Figs. 2 and 4. The cross section of the grooves 3 and 21 forming the helical passage 22 is shown greatly enlarged in Fig. 5 and is such that the area of contact between the balls and the grooves is relatively small.

There are two separate and distinct trains 27 and 28 of balls 24, in spaced parts of the helical passage 22, and in order to maintain balls in the helical passage at all times, these trains 27 and 28 are recirculated into the helical passage 22 through transfer passages constituted by transfer tubes 30 and 31 respectively.

The transfer tubes 30 and 31 are U-shaped, with parallel end portions inserted into parallel drilled orifices 34, 35 and 37, 38 respectively, extending to the outside of the nut and leading tangentially into and out of spaced parts of the helical passage 22.

The ends of the transfer tubes extend tangentially into the helical passage 22, and when the individual balls of each train reach either open end of their respective transfer tubes, they are guided thereinto and are pushed therethrough by succeeding balls, in one direction or the other, according to the direction and degree to which the shaft 1 is turned.

In the example illustrated, all the orifices 34, 35 and 37, 38 are parallel and extend to one side of the nut 20, on to which the transfer tubes 30 and 31 are clamped by a clip 40, secured to the nut by screws 41.

The underside of the nut 20 is formed as a toothed rack 45, meshing with a complementary gear sector 46 formed on a rock shaft 47, supported in needle bearings 49 and 50, in the housing 9.

It will be noted that the teeth of the sector 46 are not formed on the side of a segment of a cylinder, but rather on the side of a segment of a cone. There results a structure in which backlash between the rack and sector may be taken up by axial movement of the rock shaft 47, to the left as shown in Fig. 2. The arrangement of the teeth on the rack and sector results in a slight thrust of the shaft 47 against a thrust button 51, which is positioned to take up backlash by an adjusting screw 53, threaded in a cover 54 of the housing 9, and secured by a lock nut 55.

A conventional pitman arm 57 is secured to the end of the shaft 47 remote from the adjusting screw 53, to transmit movements of the rock shaft to the dirigible wheels of an automobile, through any suitable steering linkage (not shown).

It will be apparent that the teeth of the sector 46 prevent any turning of the nut 20, which is thus restricted to movement axially of the shaft 1 with turning of the latter.

The division of the number of balls in the helical passage 22, into a plurality of separate and distinct trains in parallel, each of which is recirculated through its own transfer passage in an independent closed circuit, effects a considerable reduction in the frictional resistance to be overcome, as compared with a structure in which the same number of balls is recirculated through a single and necessarily longer transfer passage, and thereby makes possible a ball bearing screw and nut gear in which, when necessary, a larger number of balls may be used than would otherwise be practicable.

I claim:

1. A steering gear including a helically grooved shaft mounted for rotation in suitable bearings, a nut on said shaft, moved axially thereof by rotation of the shaft, said nut having a helical internal groove corresponding with the helical groove on said shaft to form a helical passage containing balls which constitute the connection between the shaft and nut, two pairs of orifices in the nut, extending between spaced points of the helical passage and the outside of the nut, the orifices of said pairs leading respectively tangentially into and out of spaced parts of said helical passage, two transfer return tubes each interconnecting the orifices of a pair and extending tangentially into the path of the balls in the helical passage to provide two closed circuits for separate and distinct trains of balls spaced towards opposite ends of said helical passage, and each extending through at least one complete revolution thereof, a rock shaft, and a gear sector secured to said rock shaft and meshing with rack teeth on one side of said nut.

2. The combination according to claim 1, in which the two pairs of orifices and the transfer return tubes are on one side of the nut, and the rack teeth are on the opposite side of the nut.

HARRY HAWKINS.